United States Patent
Yu et al.

(10) Patent No.: US 10,852,969 B2
(45) Date of Patent: Dec. 1, 2020

(54) MEMORY SYSTEMS HAVING SEMICONDUCTOR MEMORY MODULES THEREIN THAT SUPPORT PAGE FAULT PROCESSING

(71) Applicant: Samsung Electronics Co., Ltd., Suwon-si (KR)

(72) Inventors: Yongjun Yu, Suwon-si (KR); Insu Choi, Hwaseong-si (KR); Dae-Jeong Kim, Seoul (KR); Sung-Joon Kim, Hwaseong-si (KR); Wonjae Shin, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/363,034

(22) Filed: Mar. 25, 2019

(65) Prior Publication Data
US 2019/0310783 A1    Oct. 10, 2019

(30) Foreign Application Priority Data
Apr. 4, 2018 (KR) .......................... 10-2018-0039206

(51) Int. Cl.
*G06F 3/06* (2006.01)
*G06F 12/0802* (2016.01)

(52) U.S. Cl.
CPC .......... *G06F 3/0631* (2013.01); *G06F 3/0604* (2013.01); *G06F 3/0679* (2013.01); *G06F 12/0802* (2013.01); *G06F 2212/657* (2013.01)

(58) Field of Classification Search
CPC .... G06F 3/0604; G06F 3/0679; G06F 3/0631; G06F 12/0802; G06F 2212/657
USPC ........................................................ 711/154
See application file for complete search history.

(56) References Cited

U.S. PATENT DOCUMENTS

| | | | |
|---|---|---|---|
| 6,378,059 B1 | 4/2002 | Miyoshi | |
| 8,375,191 B2 | 2/2013 | Kim | |
| 9,852,060 B2 | 12/2017 | Berke et al. | |
| 2007/0055843 A1 | 3/2007 | Lameter | |
| 2017/0075818 A1 | 3/2017 | Liu et al. | |
| 2017/0160991 A1* | 6/2017 | Choi | G06F 3/0659 |
| 2017/0344489 A1 | 11/2017 | Kapoor | |

FOREIGN PATENT DOCUMENTS

JP    2013140546    7/2013

* cited by examiner

*Primary Examiner* — Hua J Song
(74) *Attorney, Agent, or Firm* — Myers Bigel, P.A.

(57) ABSTRACT

Memory systems include a first semiconductor memory module and a processor. The processor is configured to access the first semiconductor memory module by units of a page, and further configured to respond to an occurrence of a page fault in a specific page, which is associated with a virtual address corresponding to an access target, by adjusting a number of pages and allocating pages in the first semiconductor memory module corresponding to the adjusted number of the pages, which are associated with the virtual address.

15 Claims, 14 Drawing Sheets

MEMORY SYSTEMS HAVING SEMICONDUCTOR MEMORY MODULES THEREIN THAT SUPPORT PAGE FAULT PROCESSING

REFERENCE TO PRIORITY APPLICATION

This U.S. non-provisional patent application claims priority under 35 U.S.C. § 119 to Korean Patent Application No. 10-2018-0039206, filed Apr. 4, 2018 in the Korean Intellectual Property Office, the disclosure of which is hereby incorporated herein by reference.

BACKGROUND

The present disclosure relates to a semiconductor circuit, and in particular, to a semiconductor memory module and a memory system including the same.

A semiconductor memory can include semiconductor devices, which are used to store data. The semiconductor memory may include volatile memories (e.g., dynamic and static random access memory devices) and non-volatile memories (e.g., FLASH, phase-change, ferroelectric, magnetic, and resistive memory devices). In general, a volatile memory typically supports high-speed random access and is used as a main memory of a computing system such as a personal computer, a server, or a workstation. In contrast, a nonvolatile memory typically supports large storage capacity and is used as an auxiliary storage of the computing system.

Recently, research and development on a storage class memory (SCM) are being conducted. In particular, storage class memory is being developed to support non-volatile large storage capacity and a high-speed random access. Typically, storage class memory is provided to have a memory capacity larger than that of a volatile memory, which has conventionally been used as a main memory. The use of the storage class memory may lead to rapid increases in memory capacity when used as main memory. Thus, it is necessary to develop a novel devices and/or methods, which allow for efficient accesses to large capacity main memory.

SUMMARY

Some embodiments of the inventive concept provide a memory system, which is configured to more quickly execute fault handling on a large capacity main memory when page faults occur. In addition, some embodiments of the inventive concept provide a semiconductor memory module, which is configured to execute fault handling and to allow an access following the fault handling to be more quickly executed.

According to some embodiments of the inventive concept, a memory system may include a first semiconductor memory module and a processor configured to divide a storage space of the first semiconductor memory module into pages and to access the first semiconductor memory module by units of a page. When a page fault occurs in a specific page, which is associated with a virtual address which is an access target, the processor may be configured to adjust the number of pages and to allocate pages of the first semiconductor memory module corresponding to the adjusted number of the pages, in association with the virtual address.

According to some embodiments of the inventive concept, a memory system may include a first semiconductor memory module and a processor configured to divide a storage space of the first semiconductor memory module into pages and to access the first semiconductor memory module by units of a page. When an application driven by the processor is allocated to M pages, the processor may be configured to execute fault handlings N times, where M is a positive integer and N is a positive integer that is smaller than M.

According to some embodiments of the inventive concept, a semiconductor memory module may include a non-volatile memory, a random access memory, and a controller configured to execute a write operation on the non-volatile memory or the random access memory according to a write command and a write address transmitted from an external device and to execute a read operation on the non-volatile memory or the random access memory according to a read command and a read address transmitted from the external device. When addresses of the non-volatile memory are received in a format different from a format of the write command (or read command) and the write address (or read address), the controller may be configured to execute a cache allocation of mapping a storage space of the non-volatile memory corresponding to the addresses to the random access memory.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
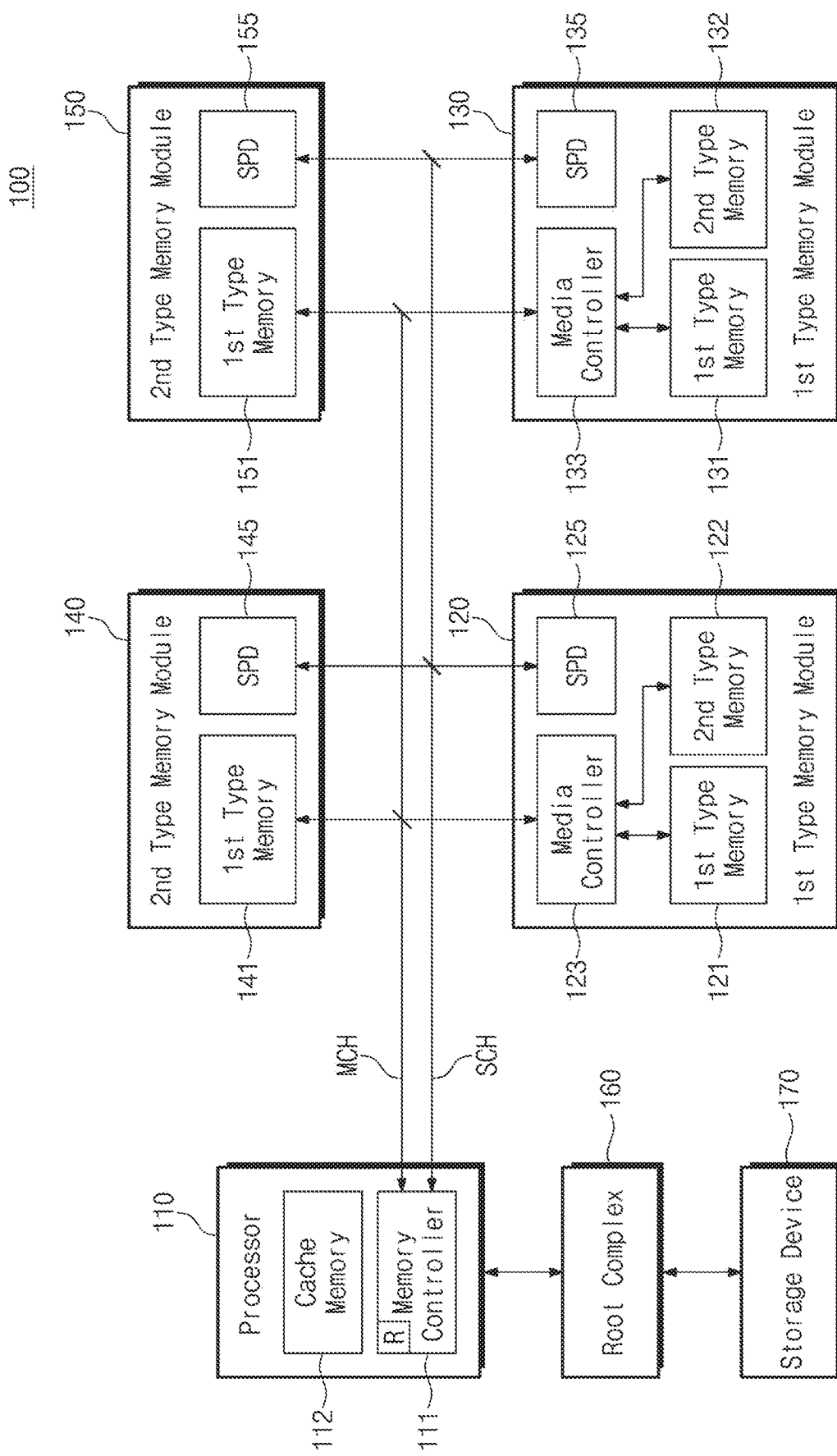
FIG. 1 is a block diagram illustrating a memory system according to some embodiments of the inventive concept.

It should be noted that these figures are intended to illustrate the general characteristics of methods, structure and/or materials utilized in certain example embodiments and to supplement the written description provided below. These drawings are not, however, necessarily to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity.

DETAILED DESCRIPTION

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a memory system 100 according to some embodiments of the inventive concept. The memory system 100 may include, for example, a server system, such as an application server, a client server, or a data server. Alternatively, the memory system 100 may include a personal computer, a workstation, etc.

Referring to FIG. 1, the memory system 100 may include a processor 110, first to fourth memory modules 120 to 150, a root complex 160, and a storage device 170, which may be electrically coupled as illustrated. The processor 110 may be configured to control elements of the memory system 100 and operations of the elements. Furthermore, the processor 110 may be configured to execute an operating system and various applications and to process data using the operating system or the applications.

The processor 110 may include a memory controller 111 and a cache memory 112. The memory controller 111 may access the first, second, third and fourth memory modules 120 to 150 through main channels MCH and supplementary channels SCH. The cache memory 112 may include a high speed and reliable memory device (e.g., a static random access memory (SRAM) device).

The memory controller 111 may include a register R. The register R may be configured to store various data, which are needed when the memory controller 111 accesses the first through fourth memory modules 120 to 150. The memory controller 111 may access the first through fourth memory modules 120 to 150, based on data stored in the register R.

The first through fourth memory modules 120 to 150 may be connected to the memory controller 111 through the main channels MCH and the supplementary channels SCH, as shown. The main channels MCH may be used to write data to and read data from the memory modules 120 to 150 (e.g., semiconductor memory modules). The main channels MCH may include a plurality of channels, which are provided for the first through fourth memory modules 120 to 150, respectively.

The supplementary channels SCH (a/k/a, secondary channels) may be used to support additional functions, which are associated with the first to fourth memory modules 120 to 150, except for the functions of writing/reading data via the main channels MCH. For example, the first to fourth memory modules 120 to 150 may provide their own peculiar data to the memory controller 111 through the supplementary channels SCH. The supplementary channels SCH may include a plurality of channels, which are provided for the first to fourth memory modules 120 to 150, respectively.

The first, second, third and fourth memory modules 120, 130, 140 and 150 may be used collectively as the main memory of the memory system 100. The first through fourth memory modules 120 to 150 may be configured to communicate with the memory controller 111 in accordance with one of various standards, such as standards for dual in-line memory module (DIMM), registered DIMM (RDIMM), and load reduced DIMM (LRDIMM)

The root complex 160 may be configured to provide channels that allow the processor 110 to access various peripheral devices, including the illustrated storage device 170, which may operate as at least one of a hard disk drive, an optical disk drive, a solid state drive, or the like.

However, the types of peripheral devices connected to the root complex 160 are not limited to the storage device 170. For example, the root complex 160 may be connected to one or more other devices, such as a modem, a graphic processing unit (GPU), and a neuromorphic processor The processor 110 may be configured to hierarchically manage the cache memory 112, the first through fourth memory modules 120, 130, 140 and 150, which serve as the main memory, and the storage device 170. For example, the processor 110 may be configured to load necessary data from the storage device 170 to the main memory supported by the memory modules 120, 130, 140 and 150. The processor 110 may also be configured to flush data to be backed up, which are stored in the main memory, to the storage device 170.

A portion of the storage area of the main memory supported by the first to fourth memory modules 120 to 150 may be mapped to the cache memory 112. In this case, where it is necessary to access a specific storage space of the main memory, the processor 110 may determine whether the specific storage space is mapped to the cache memory 112.

If the specific storage space is mapped to the cache memory 112, the processor 110 may quickly and directly access the specific storage space of the cache memory 112. However, if the specific storage space is not mapped to cache memory, the processor 110 may map or fetch a specific storage space of the first to fourth memory modules 120 to 150 to the cache memory 112.

If the storage space of the cache memory 112 has insufficient capacity, the processor 110 may release at least a portion of an existing storage space previously mapped to the cache memory 112. And, if the data of the storage space to be released is updated, the processor 110 may flush the updated data to the first to fourth memory modules 120 to 150.

The first to fourth memory modules 120 to 150 may be heterogeneous memory modules. For example, the first and second memory modules 120 and 130 may be first type memory modules, whereas the third and fourth memory modules 140 and 150 may be second type memory modules.

Thus, the first memory module 120 may include a first type memory 121, a second type memory 122, a media controller 123, and a serial presence detect (SPD) device 125. The second memory module 130 may include a first type memory 131, a second type memory 132, a media controller 133, and a serial presence detect (SPD) device 135. Hereinafter, the first type memory modules 120 and 130 will be described in more detail with reference to the first memory module 120.

The first type memory 121 may include a high speed volatile memory (e.g., a dynamic random access memory (DRAM) device). The second type memory 122 may include a non-volatile memory that has a lower speed and a larger storage capacity than the first type memory 121. For example, the second type memory 122 may include at least one of a FLASH memory, a phase-change memory, a ferroelectric memory, a magnetic memory, a resistive memory, or the like.

The media controller 123 may be configured to deliver an access command, which is transmitted from an external host device (e.g., the memory controller 111 or the processor 110) through a corresponding channel of the main channels MCH, to the first type memory 121 or the second type memory 122. According to the access command, the media controller 123 may exchange data with the external host device (e.g., the memory controller 111 or the processor 110) through a corresponding channel of the main channels MCH.

The media controller 123 may provide a storage capacity or storage space of the second type memory 122 to the external host device (e.g., the memory controller 111 or the processor 110). Under the control of the media controller 123, the first type memory 121 may be used as a cache memory of the second type memory 122.

For example, the media controller 123 may be configured to map a portion of a storage space of the second type memory 122 to the first type memory 121. If a storage space, which is associated with the access command provided from the external host device (e.g., the memory controller 111 or the processor 110), is mapped to the first type memory 121, the media controller 123 may deliver the access command to the first type memory 121.

If a storage space, which is associated with the access command provided from the external host device (e.g., the memory controller 111 or the processor 110), is not mapped to the first type memory 121, the media controller 123 may map or backup the corresponding storage space from the second type memory 122 to the first type memory 121.

If the storage space of the first type memory 121 is insufficient, the media controller 123 may release at least a portion of an existing storage space previously mapped to the first type memory 121. If the data of the storage space to be released is updated, the media controller 123 may flush the update data to the second type memory 122.

The SPD device 125 may communicate with the external host device (e.g., the memory controller 111 or the processor 110) through a corresponding channel of the supplementary channels SCH. For example, when the first memory module 120 is initialized, the SPD device 125 may provide data stored therein to the external host device (e.g., the memory controller 111 or the processor 110) through a corresponding channel of the supplementary channels SCH.

For example, the SPD device 125 may store information on a storage capacity of the first memory module 120, which is provided to the external host device (e.g., the memory controller 111 or the processor 110). For example, the SPD device 125 may store information on the storage capacity of the second type memory 122. When the initialization is executed, the SPD device 125 may provide the information on the storage capacity of the second type memory 122 to the external host device (e.g., the memory controller 111 or the processor 110).

The capacity information stored in the SPD device 125 may contain, for example, information on a user capacity of the second type memory 122. The storage capacity of the second type memory 122 may include a user capacity, a meta-capacity, and a reserved capacity. The user capacity may be a storage capacity which is provided to the external host device (e.g., the memory controller 111) by the second type memory 122.

The meta-capacity may be a storage capacity, which is provided to store various types of metadata for managing the second type memory 122 and is not exposed to the external host device (e.g., the memory controller 111). The reserved capacity may be a storage capacity, which is provided to manage the second type memory 122 and is not exposed to the external host device (e.g., the memory controller 111).

The capacity information stored in the SPD device 125 may contain information on a user capacity of the second type memory 122. Hereinafter, unless otherwise defined, the capacity of the second type memory 122 may be interpreted as indicating the user capacity of the second type memory 122.

The third memory module 140 may include a first type memory 141 and a SPD device 145. Similarly, the fourth memory module 150 may include a first type memory 151 and a SPD device 155. Hereinafter, the second type memory modules 140 and 150 will be described in more detail with reference to the third memory module 140.

The first type memory 141 may include a dynamic random access memory, similar to the first type memory 121 of the first memory module 120. The SPD device 145 may communicate with the external host device (e.g., the memory controller 111 or the processor 110) through a corresponding channel of the supplementary channels SCH. For example, when the third memory module 140 is initialized, the SPD device 145 may provide data stored therein to the external host device (e.g., the memory controller 111 or the processor 110) through a corresponding channel of the supplementary channels SCH.

For example, the SPD device 145 may store information on a storage capacity of the third memory module 140, which is provided to the external host device (e.g., the memory controller 111 or the processor 110). For example, the SPD device 145 may store information on the storage capacity of the first type memory 141. When the initialization is executed, the SPD device 145 may provide the information on the storage capacity of the first type memory 141 to the external host device (e.g., the memory controller 111 or the processor 110).

If power is supplied to the memory system 100, the memory controller 111 may initialize the first through fourth memory modules 120 to 150. For example, the SPD devices 125, 135, 145 and 155 of the first to fourth memory modules 120 to 150 may provide respective capacity information to the memory controller 111 through the supplementary channels SCH.

The SPD devices 125 and 135 of the first type memory modules 120 and 130 may provide respective storage capacities of the second type memories 122 and 132 to the memory controller 111. The SPD devices 145 and 155 of the second type memory modules 140 and 150 may provide respective storage capacities of the first type memories 141 and 151 to the memory controller 111. For example, the memory controller 111 may read respective storage capacities from the SPD devices 125, 135, 145 and 155.

In the aforementioned embodiments, the structure in which the storage device 170 is connected to the root complex 160 is illustrated. However, a device connected to the root complex 160 is not limited to the storage device 170.

Figure 2:
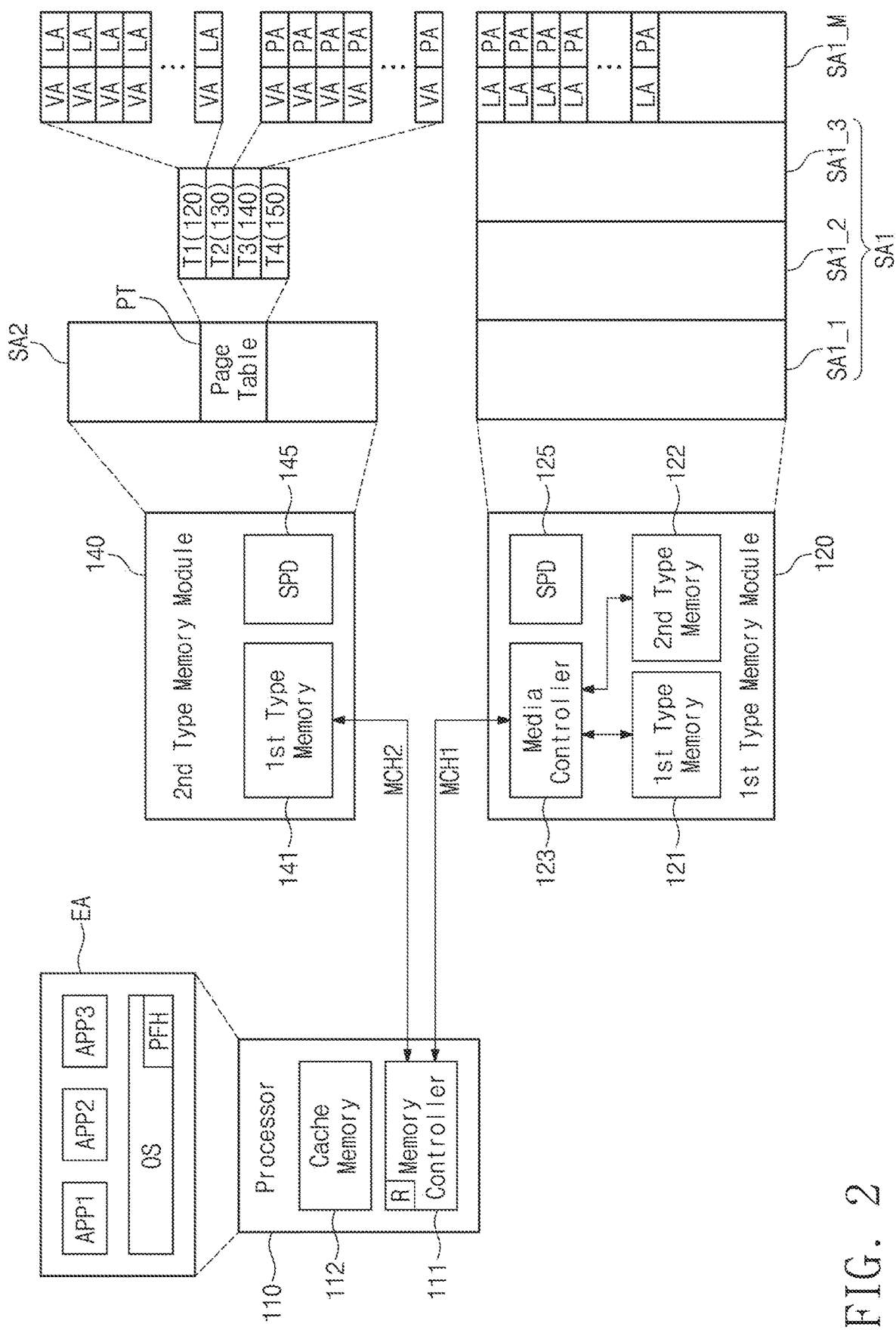
FIG. 2 illustrates an example in which first and third memory modules are accessed by a processor.

FIG. 2 illustrates an example in which the first and third memory modules 120 and 140 are accessed by the processor 110. In order to reduce complexity in the drawings, other elements, except for the processor 110, the first memory module 120, and the third memory module 140, will be omitted.

An execution area "EA" of FIG. 2 illustrates entities to be executed in the processor 110. As shown in the execution area EA, an operating system OS may be executed in the processor 110. Furthermore, in the processor 110, first to third applications APP1-APP3 may be executed on the operating system OS.

The operating system OS may include a page fault handler PFH. The page fault handler PFH may be configured to handle a page fault, which may occur when the first to third applications APP1-APP3 access the first and third memory modules 120 and 140. An operation of the page fault handler PFH will be described in more detail with reference to FIGS. 3 and 4.

The first memory module 120 may provide a storage space of the second type memory 122 to the processor 110. A storage space corresponding to the user capacity of the first memory module 120 will be illustrated as a first storage area SA1. The first storage area SA1 may include first to third sub-storage areas SA1_1-SA1_3.

The first to third sub-storage areas SA1_1-SA1_3 may be storage areas, which are included in the storage space of the second type memory 122 and are logically or physically distinguished from each other. Different addresses may be used for access to the first to third sub-storage areas SA1_1-SA1_3.

In addition to the first storage area SA1, a storage space corresponding to the meta-capacity of the first memory module 120 will be illustrated as a first meta-storage area SA1_M. The media controller 123 may store various data, which are needed for access to the first storage area SA1, in the first meta-storage area SA1_M.

The third memory module 140 may provide the storage space of the first type memory 141 to the processor 110. The storage space of the third memory module 140 will be illustrated as a second storage area SA2. The second storage area SA2 may be smaller than the first storage area SA1.

If the memory system 100 is initialized, the memory controller 111 of the processor 110 may distinguish the storage spaces of the first to fourth memory modules 120 to 150 through the supplementary channels SCH. The processor 110 (e.g., the operating system OS) may allocate addresses (e.g., virtual addresses VA) to the distinguished storage spaces.

The processor 110 (e.g., the operating system OS) may access the first storage area SA1 and the second storage area SA2 using the virtual addresses VA. The processor 110 (e.g., the operating system OS) may allocate the storage space of the first to fourth memory modules 120 to 150 to the first to third applications APP1-APP3 using the virtual addresses VA.

The memory controller 111 may receive an access command, which is based on the virtual addresses VA, from the processor 110. The memory controller 111 may convert the virtual addresses VA into actual addresses of the first to fourth memory modules 120 to 150. The memory controller 111 may access the first to fourth memory modules 120 to 150 through the main channels MCH, based on the actual addresses. For example, the memory controller 111 may access the first and third memory modules 120 and 140, respectively, through first and second main channels MCH1 and MCH2.

The memory controller 111 may store a page table PT, which contains mapping information between the virtual addresses VA allocated by the processor 110 and the actual addresses of the first to fourth memory modules 120 to 150, in the third memory module 140. The page table PT may include first to fourth tables T1-T4, each of which is associated with a corresponding one of the first to fourth memory modules 120 to 150.

In some embodiments, the memory controller 111 may store the page table PT in one of the second type memory modules 140 and 150. In certain embodiments, the memory controller 111 may store the page table PT in one of the first to fourth memory modules 120 to 150. For example, the memory controller 111 may store the first to fourth tables T1-T4 on the first to fourth memory modules 120 to 150 in a single memory module.

The second type memory modules 140 and 150 may be directly accessed by the memory controller 111. In the case where the memory controller 111 accesses the second type memory modules 140 and 150, the access may be executed based on physical addresses PA of the first type memories 141 and 151. Thus, the third and fourth tables T3 and T4 for the second type memory modules 140 and 150 may contain the mapping information between the virtual addresses VA and the physical addresses PA of the second type memory modules 140 and 150.

The first type memory modules 120 and 130 may not be directly accessed by the memory controller 111. The memory controller 111 may access the first type memory modules 120 and 130 through the media controller 123 or 133. In the case where the memory controller 111 accesses the first type memory modules 120 and 130, the access may be executed based on logical addresses LA that are different from the physical addresses PA of the second type memories 122 and 132.

The media controller 123 or 133 may store the mapping information between the logical addresses LA and the physical addresses PA of the second type memory 122 or 132, which will be used by the memory controller 111, in the first meta-storage area SA1_M. The media controller 123 or 133 may convert the access command, which is provided from the memory controller 111, into an access command for the second type memory 122 or 132, using the mapping information stored in the first meta-storage area SA1_M.

Since the memory controller 111 uses the logical addresses LA of the first type memory modules 120 and 130, the first and second tables T1 and T2 for the first type memory modules 120 and 130 may contain the mapping information between the virtual addresses VA and the logical addresses LA.

The memory controller 111 may store a start address of the storage space of the third memory module 140, in which the page table PT is stored, and information on a size of the page table PT in the register R. In the case where at least one of the operating system OS and the first to third applications APP1-APP3 requests an access to the first to fourth memory modules 120 to 150 based on the virtual addresses VA, the memory controller 111 may initially refer to the register R to search a location (e.g., address) in which the page table PT is stored and then may transmit an access command to the first to fourth memory modules 120 to 150, depending on a result of the search.

Figure 3:
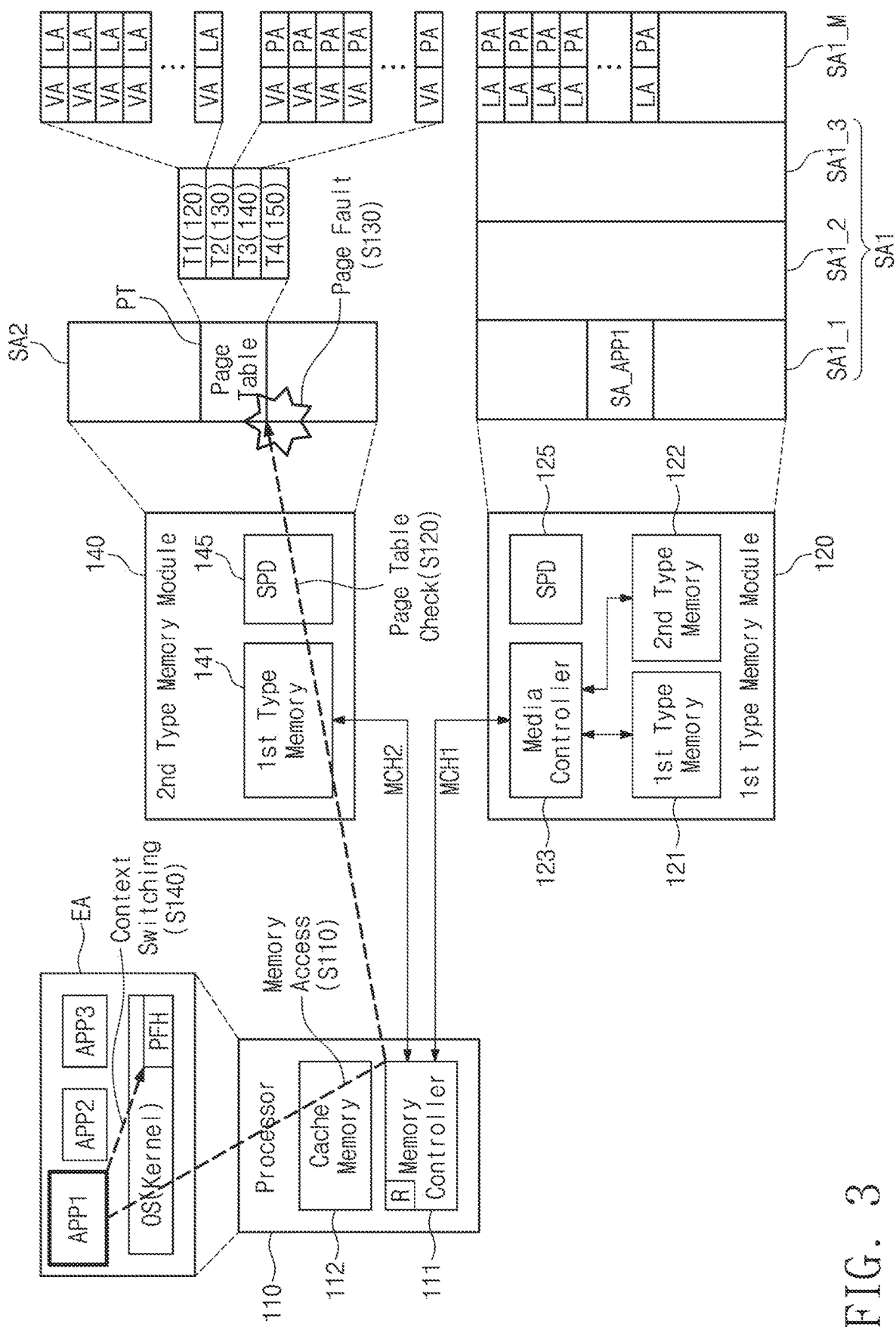
FIG. 3 illustrates an example of a page fault to occur in the memory system.

FIG. 3 illustrates an example of an occurrence of a page fault in the memory system 100. Referring to FIGS. 1 and 3, in step S110, which is shown by a dotted line, the first application APP1 may request a memory access on the first memory module 120. The request from the first application APP1 may be transmitted to the memory controller 111 through the operating system OS. In step S120, which is illustrated by a dotted line, the memory controller 111 may refer to the register R to search the page table PT.

If the mapping information of the virtual addresses VA of the first memory module 120, for which the memory access is requested, does not exist in the first table T1, a page fault may occur in step S130, which is shown by a highlighted "star". For example, if the first application APP1 requests allocation of a new memory, the operating system OS may instruct the memory controller 111 to perform a memory access for such memory allocation.

Since allocation of a previously-unused new memory is requested, mapping information for this may not exist in the first table T1. In other words, when the allocation of a new memory is executed, the page fault may occur. For example, when the first application APP1 starts to run, the allocation of a new memory may be requested to cause the page fault. If the page fault occurs, a context switching from the first application APP1 to the operating system OS may be executed, in step S140, which is shown by a dotted line in the highlighted portion of the processor 110 in FIG. 3.

Figure 4:
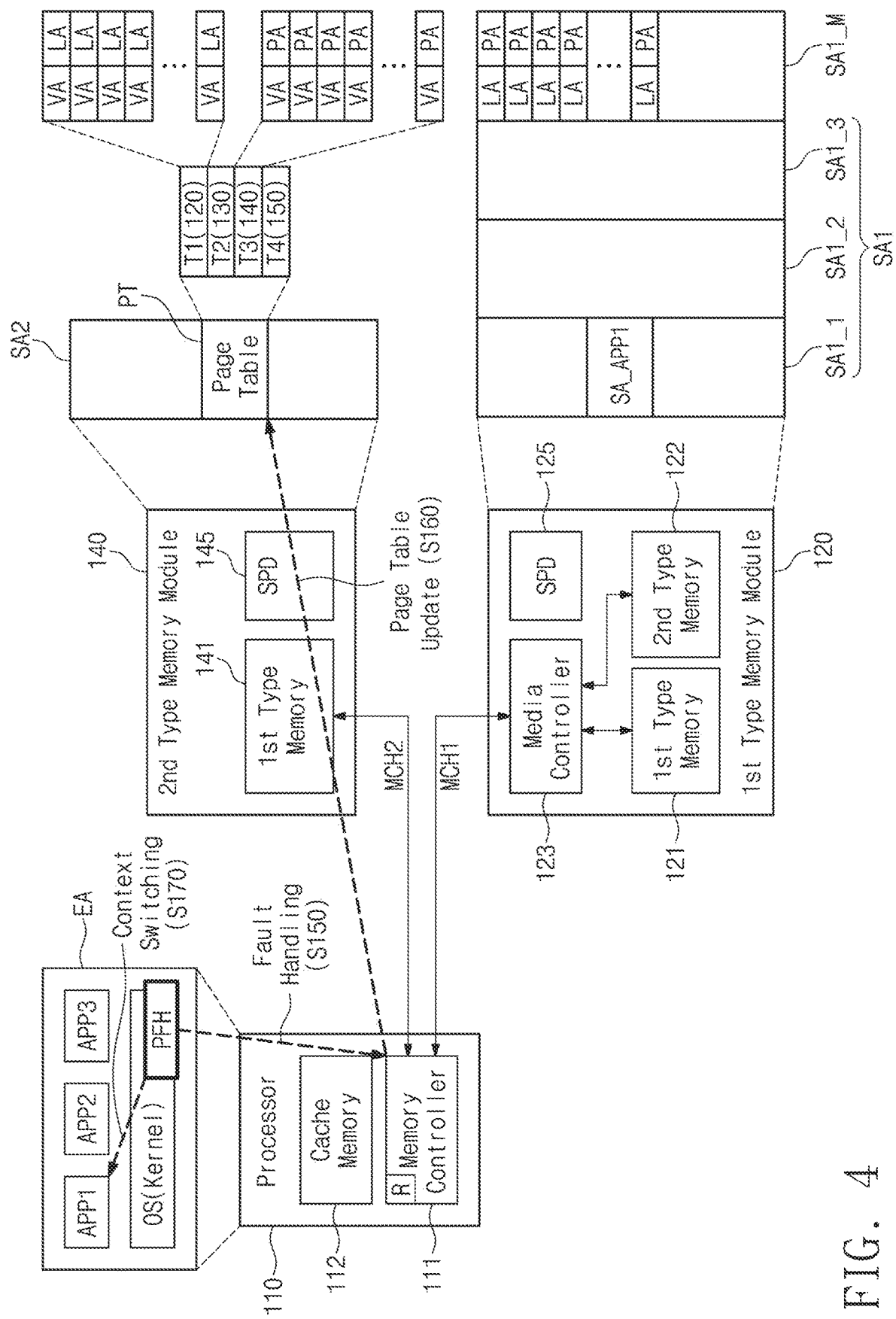
FIG. 4 illustrates an example of a fault handling to be executed in the memory system.

FIG. 4 illustrates an example of a fault handling to be executed in the memory system 100. Referring to FIG. 4, in step S150, which is shown by a dotted line, the page fault handler PFH of the operating system OS may execute a fault handling operation. For example, the page fault handler PFH may map a logical address LA of a free page of the first memory module 120 to a virtual address VA, which is requested by the first application APP1.

For example, if the first to fourth memory modules 120 to 150 have insufficient free capacity, the processor 110 may swap a portion of data stored in the first storage area SA1 of the first memory module 120 to the storage device 170 and may release a storage space for the swapped data to secure an increased free capacity in the first storage area SA1.

The mapped logical address LA may be allocated to the first storage area SA1 as a first application storage area SA_APP1 for the first application APP1. In step S160, as shown by a dotted line, the memory controller 111 may write the mapping information of the first application storage area SA_APP1 in the first table T1 of the page table PT, thereby updating the page table. In step S170, a context switching operation from the page fault handler PFH to the first application APP1 may be executed, after the fault handling (S150).

If, as described with reference to FIGS. 3 and 4, the page fault occurs and the fault handling is executed, the context switching may be executed two times. The context switching may lead to resource consumption in the memory system 100 and a reduction in operation speed of the memory system 100.

Figure 5:
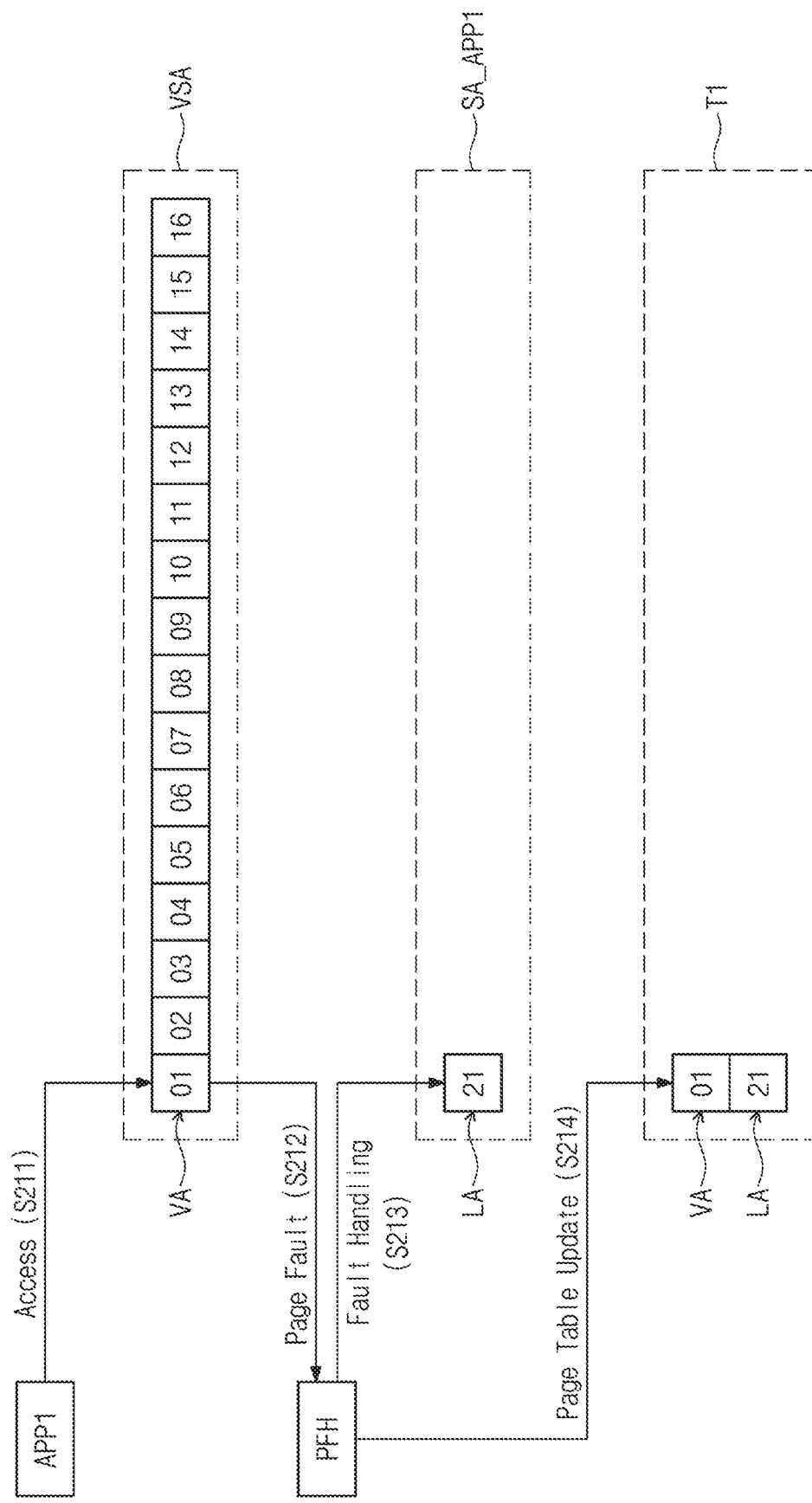
FIG. 5 illustrates an example in which a virtual storage space identified with virtual addresses of '01'-'16' is allocated to a first application.

FIG. 5 illustrates an example in which a virtual storage area VSA identified with virtual addresses of '01'-'16' is allocated to the first application APP1. Referring to FIGS. 1 and 5, in step S211, the first application APP1 may request an access to a portion of the virtual storage area VSA having a virtual address VA of '01'. The virtual address VA of '01' may correspond to, for example, the first memory module 120.

Since the mapping information on the virtual address VA of '01' does not exist in the first table T1 (e.g., see FIG. 3), a page fault may occur, in step S212. Thereafter, the context switching may be executed, and the page fault handler PFH may be activated. In step S213, the page fault handler PFH may execute the fault handling.

For example, the page fault handler PFH may map a portion of the first application storage area SA_APP1 having a logical address LA of '21' to the virtual address VA of '01'. The logical address LA of '21' may correspond to, for example, the first memory module 120. In step S214, the page fault handler PFH may execute a page table updating on the first table T1 to contain the mapping information between the virtual address VA of '01' and the logical address LA of '21'.

Figure 6:
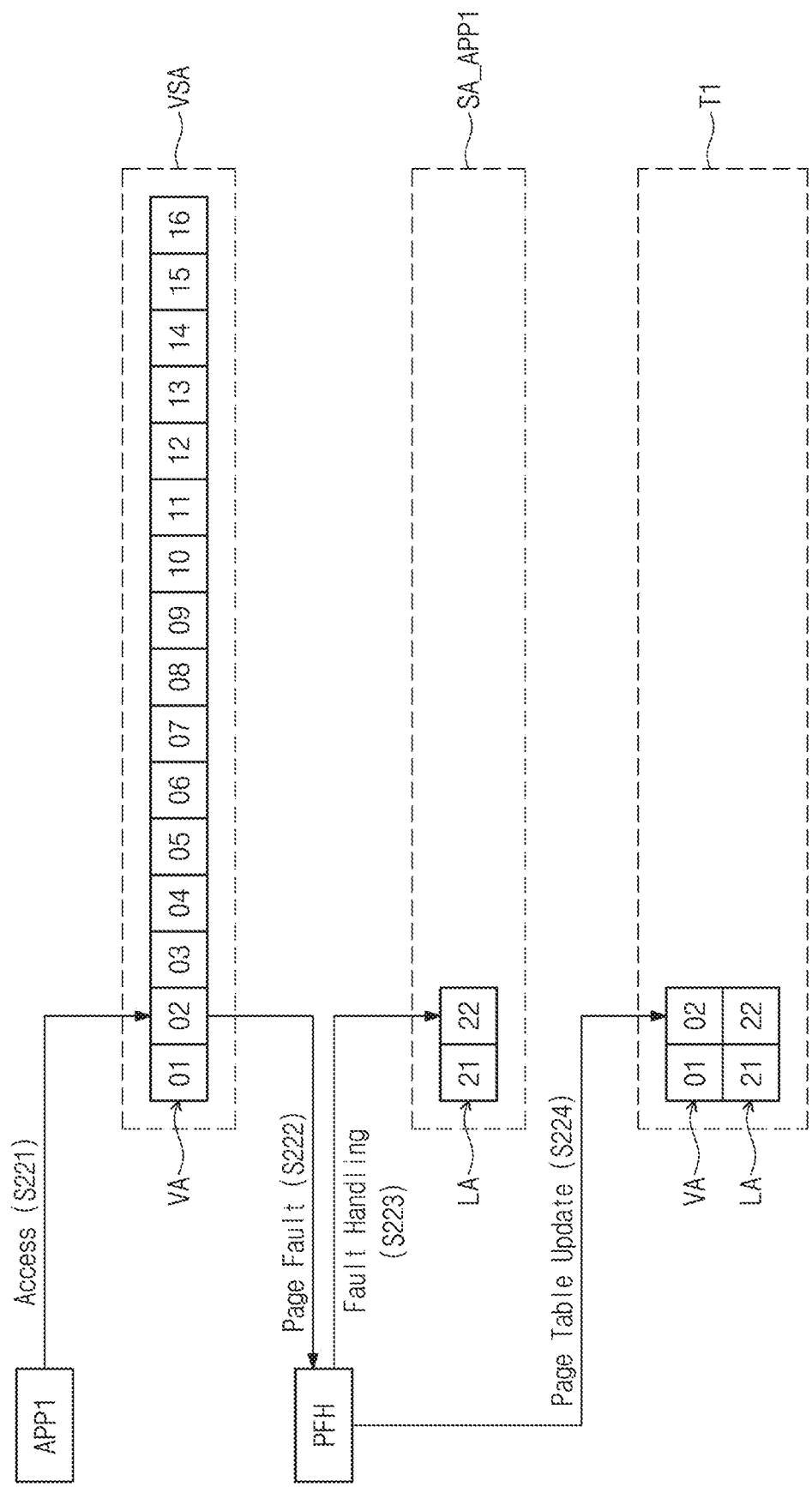
FIG. 6 illustrates an example of a virtual address allocation, which will be executed after the step of FIG. 5, according to a first embodiment.

FIG. 6 illustrates an example of a step of allocating the virtual addresses VA, which will be executed after the step of FIG. 5, according to a first embodiment. Referring to FIG. 6, in step S221, the first application APP1 may access a next page of the virtual storage area VSA, which has a virtual address VA of '02'. A page fault may occur in step S222, and the fault handling may be executed in step S223.

The page fault handler PFH may allocate a portion of the first application storage area SA_APP1 having a logical address LA of '22' to the virtual address VA of '02'. In step S224, the page fault handler PFH may execute a page table updating on the first table T1 to contain the mapping information between the virtual address VA of '02' and the logical address LA of '22'. The first application APP1 may request sequential accesses to virtual addresses VA of '01' to '16' in the same manner as described with reference to FIGS. 5 and 6.

Figure 7:
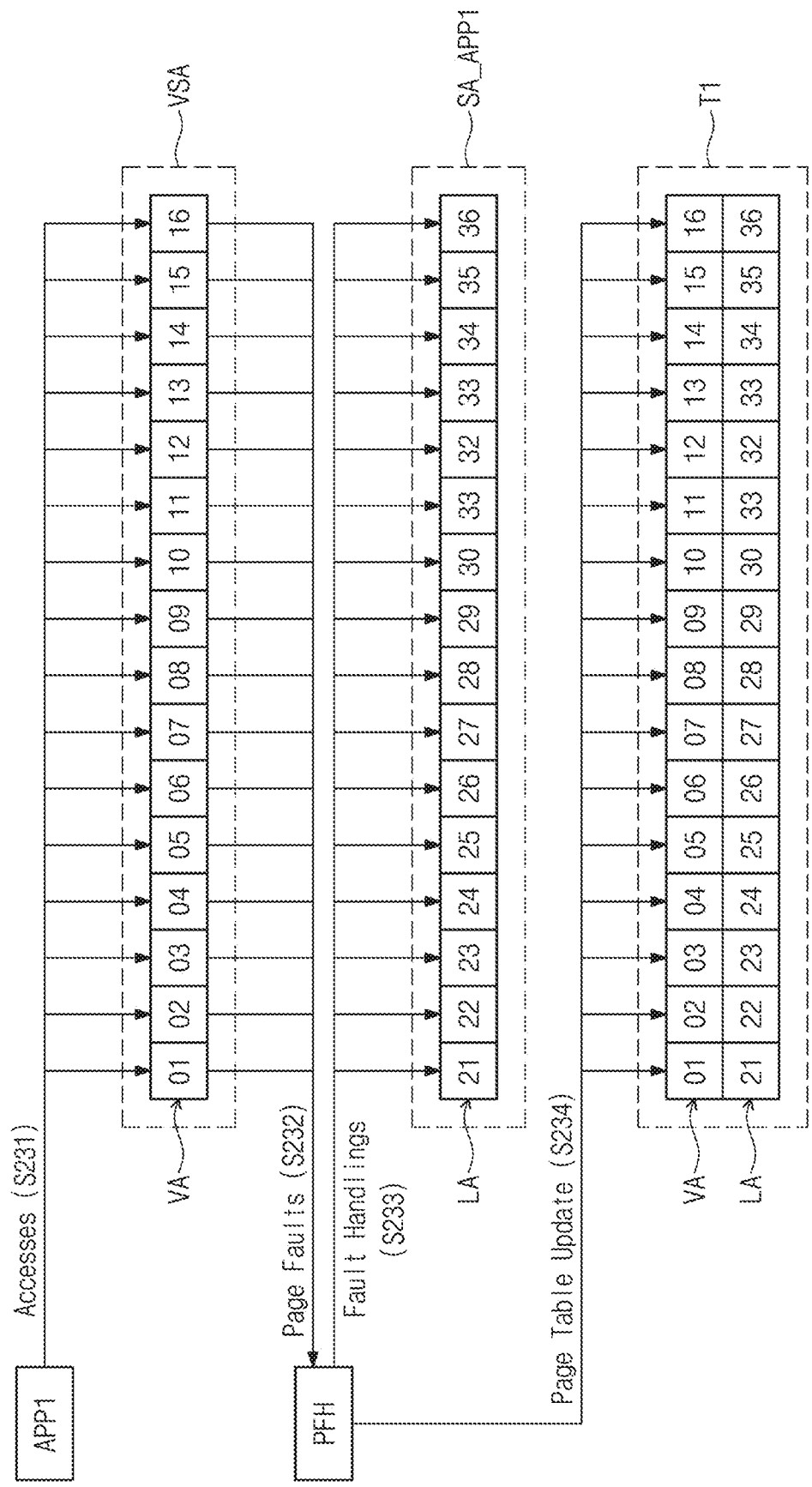
FIG. 7 illustrates an example of a page fault handling, which is executed on the virtual addresses of '01'-'16' by a page fault handler, according to a first embodiment.

FIG. 7 illustrates an example of a page fault handling, which is executed on the virtual addresses of '01'-'16' by the page fault handler PFH, according to a first embodiment. Referring to FIG. 7, the page fault handler PFH may map a portion of the first application storage area SA_APP1 having the logical addresses LA of '21' to '36' to a portion of the virtual storage area VSA having the virtual addresses VA of '01' to '16' through steps S231, S232, S233 and S234. The page fault handler PFH may execute a page fault handling on each of the virtual addresses VA of '01' to '16'.

Typically, a size of a page may be 4 KB. A memory capacity used by the first application APP1 may range from several megabytes to several gigabytes. As large capacity storage class memories, such as the first type memory modules 120 and 130, are introduced, a memory capacity used by the first application APP1 may increase.

In the case where a capacity memory allocated for the first application APP1 is large, the fault handling, which is executed by units of the page (i.e., of 4 KB), may lead to excessive consumption of resources of the processor 110 and deterioration in operation speeds of the processor 110 and the memory system 100. By contrast, according to some embodiments of the inventive concept, the number of the fault handling, which is executed by the processor 110 (or the operating system OS), may be smaller than the number of pages, to which the access is requested by the first application APP1, and in this case, the above issue may be successfully overcome.

Figure 8:
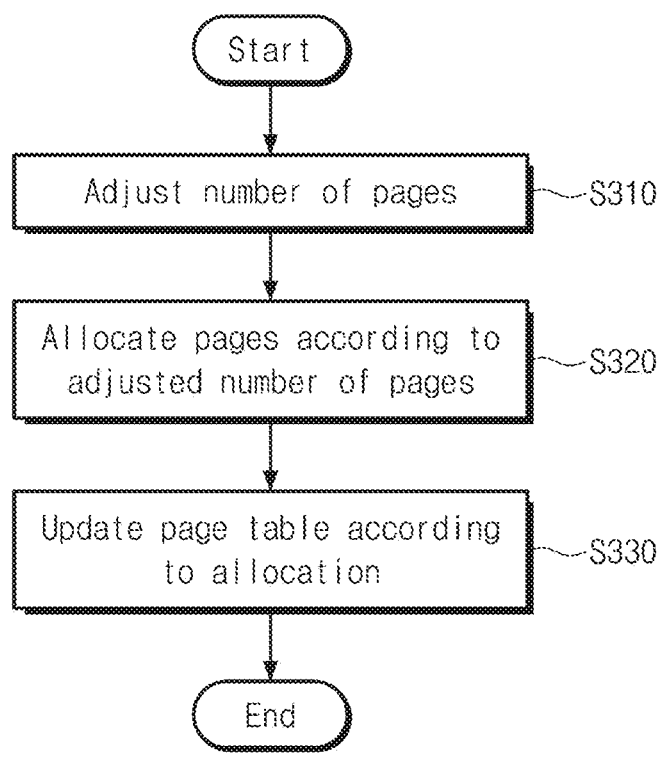
FIG. 8 illustrates a method of performing a fault handling, according to a second embodiment of the inventive concept.

FIG. 8 illustrates a method of performing a fault handling, according to a second embodiment of the inventive concept. Referring to FIGS. 2 and 8, in step S310, the page fault handler PFH may adjust the number of pages. In step S320, the page fault handler PFH may allocate pages according to the adjusted number of pages. In step S330, the page fault handler PFH may update the page table PT according to the allocation.

For example, the page fault handler PFH may adjust the number of pages according to a property of an access, in which a page fault occurred. The page fault handler PFH may map two or more virtual addresses VA and two or more logical addresses LA to each other, when a fault handling associated with a specific access is executed.

In the case where a page fault is caused by an operation (e.g., the memory allocation) of accessing the successive virtual addresses, the page fault handler PFH may sequentially increase the numbers of the virtual and logical addresses VA and LA, which are mapped to each other during the fault handling.

Figure 9:
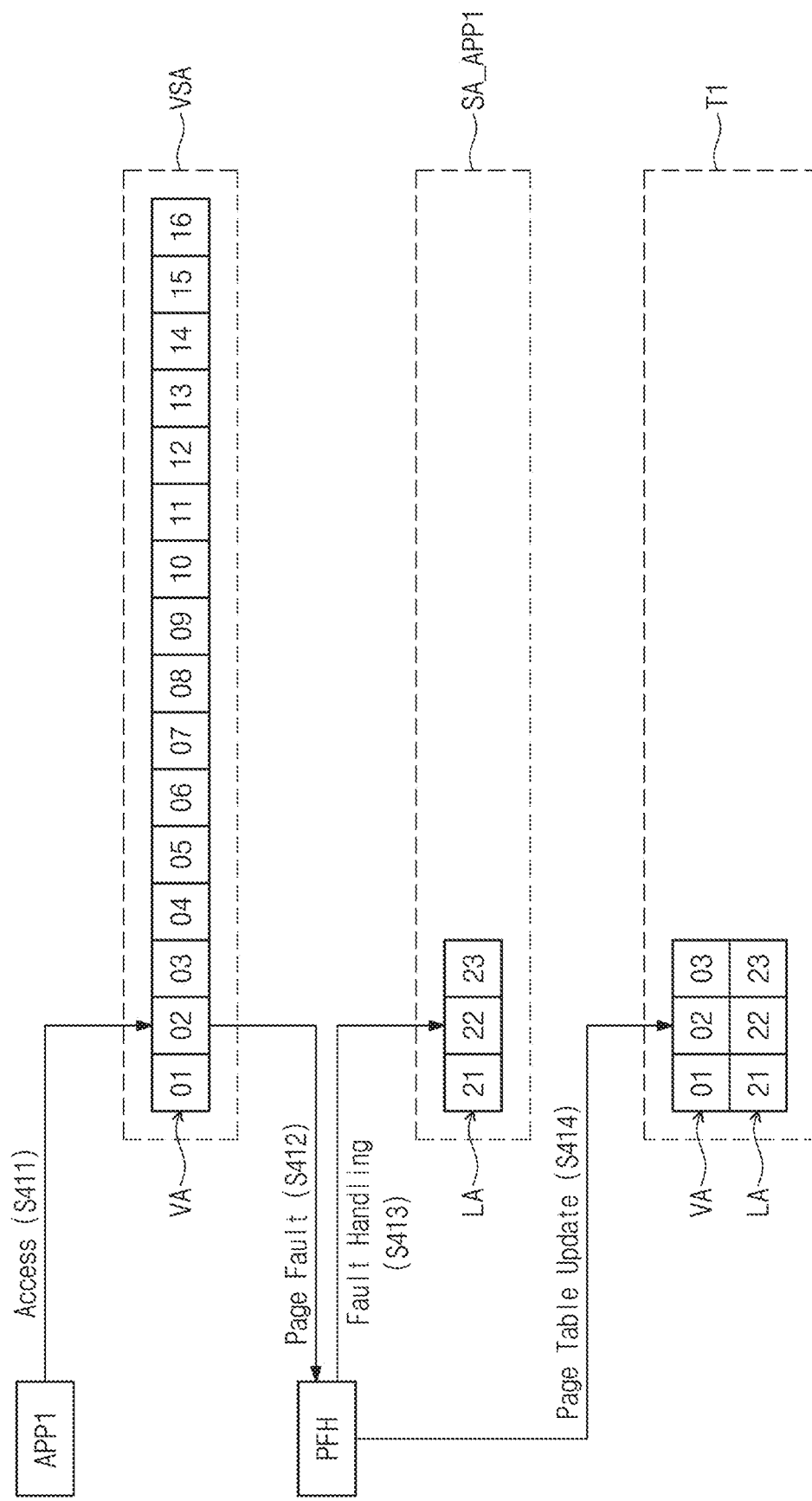
FIG. 9 illustrates an example of a virtual address allocation, which will be executed after the step of FIG. 5, according to a second embodiment.

FIG. 9 illustrates an example of a step of allocating the virtual addresses VA, which will be executed after the step of FIG. 5, according to a second embodiment. Referring to FIG. 9, in step S411, the first application APP1 may access a next page of the virtual storage area VSA, which has a virtual address VA of '02'. A page fault may occur in step S412, and the fault handling may be executed in step S413.

The page fault handler PFH of FIG. 9 may be configured to map two or more logical addresses to two or more virtual addresses. For example, the page fault handler PFH may be configured to allocate the logical address LA of '22' of the first application storage area SA_APP1 to the virtual address VA of '02' and to map the logical address LA of '23' to the virtual address VA of '03'.

In step S414, the page fault handler PFH may execute a page table updating on the first table T1 to contain the mapping information between the virtual address VA of '02' and the logical address LA of '22' and between the virtual address VA of '03' and the logical address LA of '23'.

Figure 10:
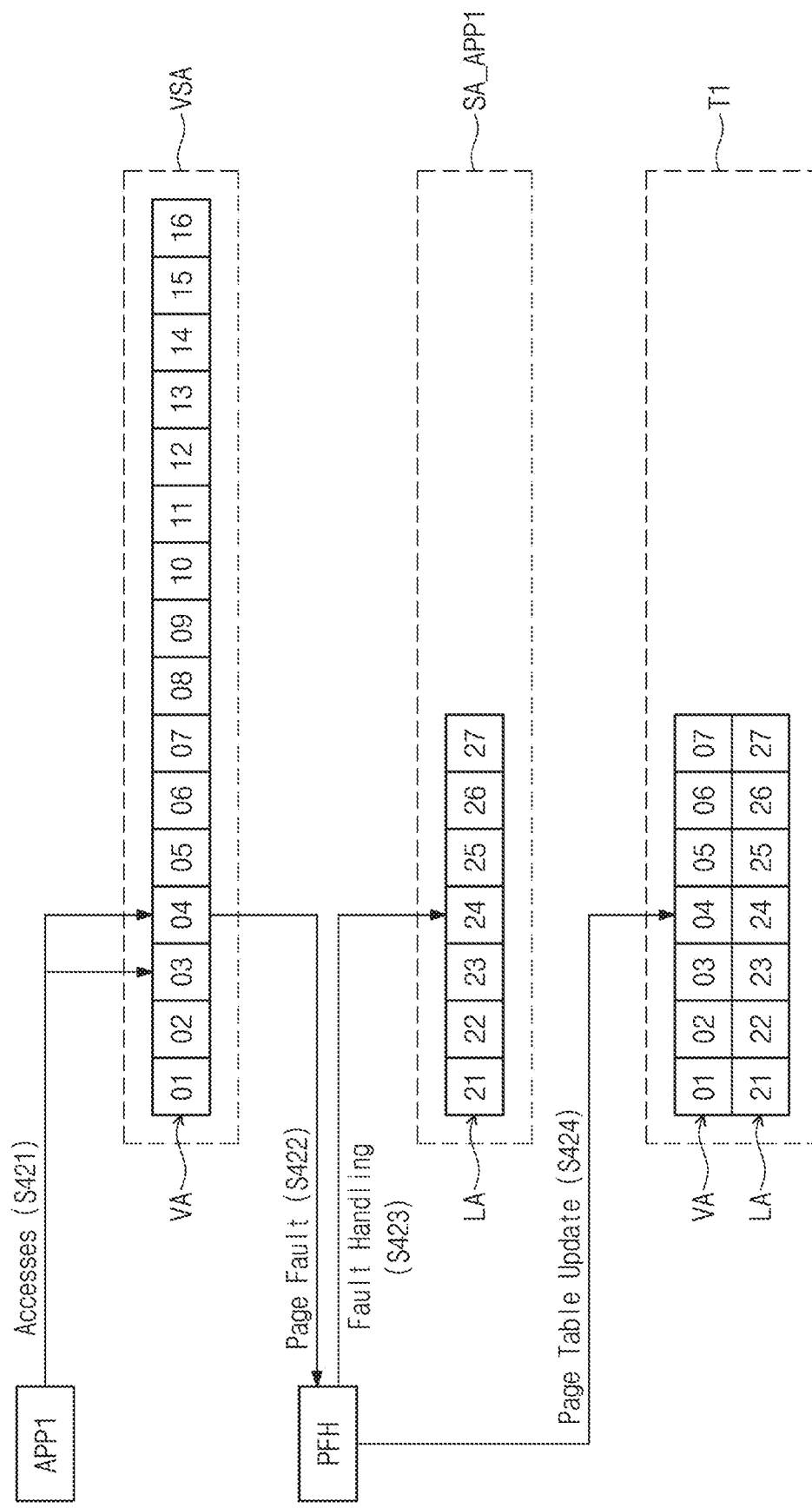
FIG. 10 illustrates an example of a virtual address allocation, which will be executed after the step of FIG. 9, according to a second embodiment.

FIG. 10 illustrates an example of a step of allocating a virtual address, which will be executed after the step of FIG. 9, according to a second embodiment of the invention. Referring to FIG. 10, in step S421, the first application APP1 may access pages of the virtual storage area VSA, whose virtual addresses VA are '02' and '03', in a sequential manner.

Since the virtual address VA of '03' is mapped to a logical address LA of '23', a page fault may not occur when the first application APP1 accesses the virtual address VA of '03'. However, because a virtual address VA of '04' is not mapped to the logical address LA, a page fault may occur when the first application APP1 accesses a virtual address VA of '04' or in step S422. In step S423, the fault handling may be executed.

The page fault handler PFH may be configured to map two or more logical addresses to two or more virtual addresses. For example, the page fault handler PFH may be configured to allocate a logical address LA of '24' of the first application storage area SA_APP1 to a virtual address VA of '04', to map a logical address LA of '25' to a virtual address VA of '05', to allocate a logical address LA of '26 to a virtual address VA of '06', and to map a logical address LA of '27' to a virtual address VA of '07'.

In step S424, the page fault handler PFH may execute an update of the page table (e.g., first table T1) to contain the mapping information between the virtual address VA of '04' and the logical address LA of '24', between the virtual address VA of '05' and the logical address LA of '25', between the virtual address VA of '06' and the logical address LA of '26', and between the virtual address VA of '07' and the logical address LA of '27'.

As described with reference to FIGS. 9 and 10, the first application APP1 may sequentially increase the number of the logical addresses LA and the number of the virtual addresses VA, which are mapped to each other during the execution of the fault handling.

Figure 11:
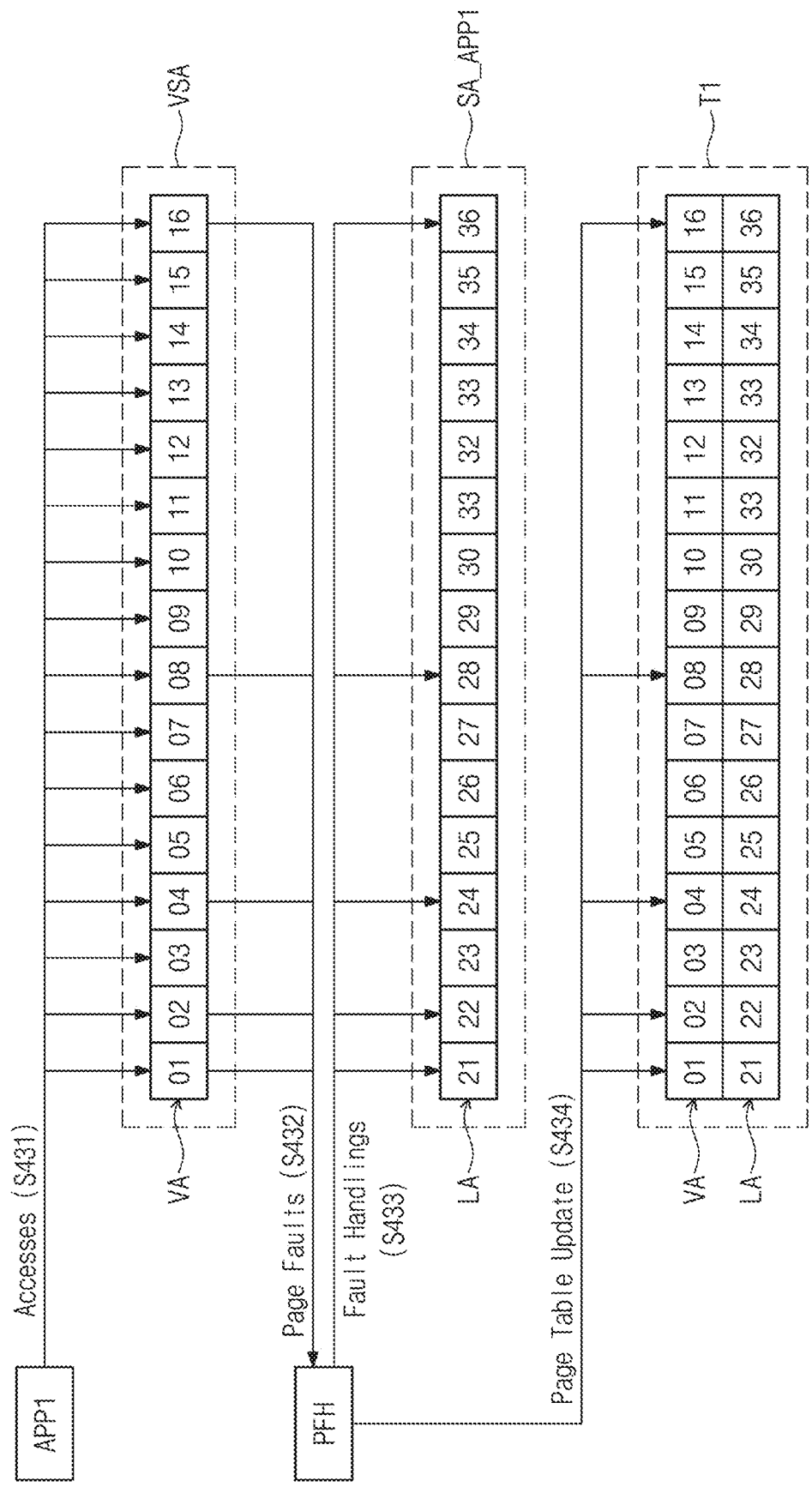
FIG. 11 illustrates an example of a page fault handling, which is executed on the virtual addresses of '01'-'16' by a page fault handler, according to a second embodiment.

FIG. 11 illustrates an example of page fault handling operations, which are executed on the virtual addresses VA of '01'-'16' by the page fault handler PFH, according to a second embodiment. Referring to FIG. 11, the page fault handler PFH may map a portion of the first application storage area SA_APP1 having the logical addresses LA of '21' to '36' to a portion of the virtual storage area VSA having the virtual addresses VA of '01' to '16' through steps S431, S432, S433 and S434. The page fault handler PFH may execute a page fault handling on each of the virtual addresses VA of '01', '02', '04', '08', and '16'.

In comparison with the first embodiment of FIG. 7, it may be possible to reduce the number of executions of the fault handling according to the second embodiment of FIG. 11. Thus, it may be possible to reduce the number of executions of the context switching, to more quickly execute the fault handlings, and thereby to increase operating speeds of the processor 110 and the memory system 100.

Figure 12:
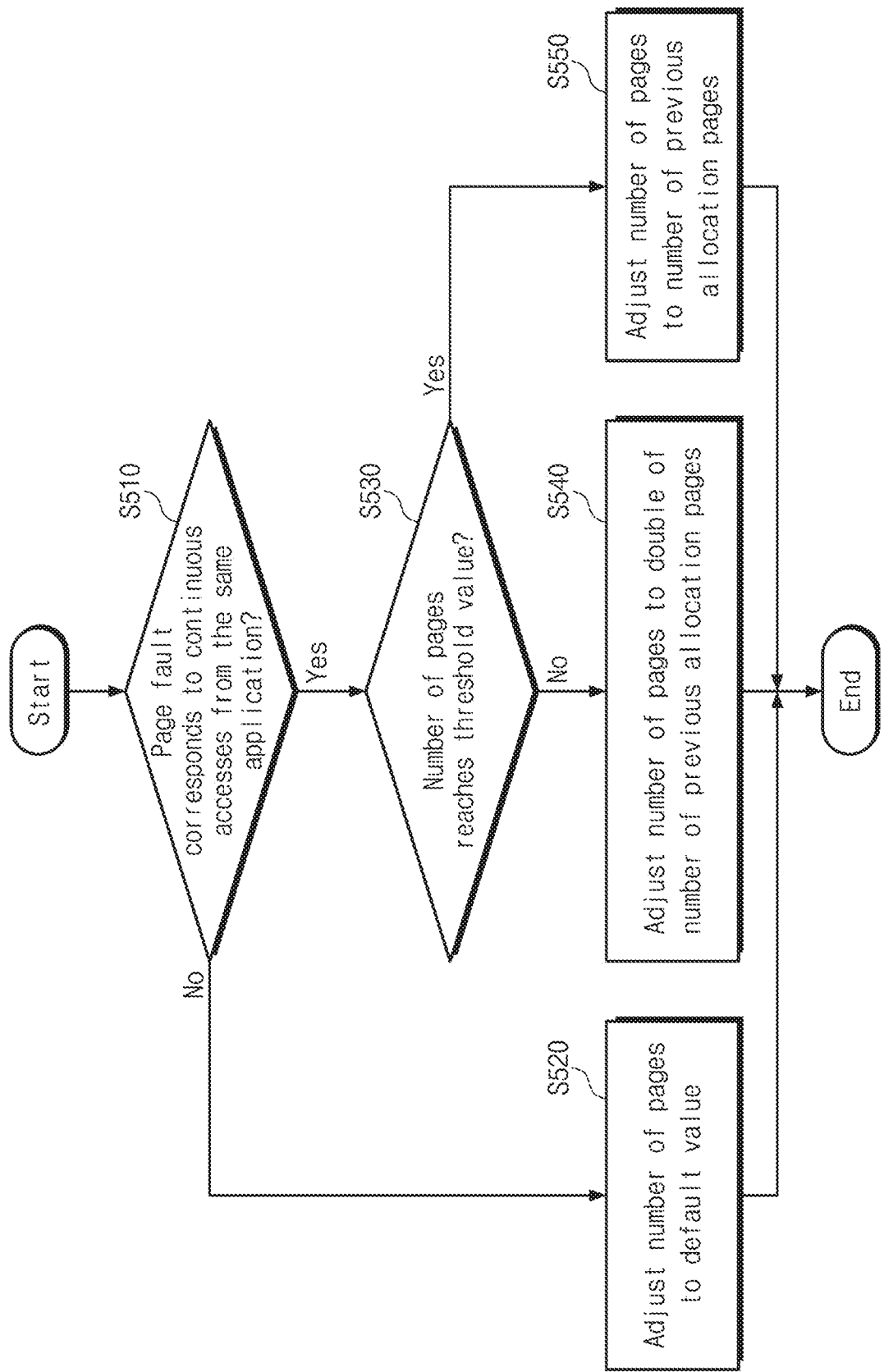
FIG. 12 illustrates an example of a method of adjusting the number of pages, according to some embodiments of the inventive concept.

FIG. 12 illustrates an example of a method of adjusting the number of pages, according to some embodiments of the inventive concept. Referring to FIGS. 2 and 12, in step S510, the page fault handler PFH may determine whether a page fault is caused by continuous (or successive) accesses from the same application (e.g., APP1) (for example, by accesses to the successive virtual addresses VA).

For example, the page fault handler PFH may determine whether a virtual address of an access causing the page fault and a virtual address of a previous access are successive. If the page fault is not caused by successive accesses (i.e., if a virtual address associated with the page fault and a virtual address of a previous access are not successive), a step S520 may be executed. In step S520, the page fault handler PFH may adjust the number of pages to a default value (e.g., '1'). Thereafter, the adjustment may be terminated.

If the page fault is caused by successive accesses (i.e., if a virtual address associated with the page fault and a virtual address of a previous access are successive), a step S530 may be executed. In step S530, the page fault handler PFH may determine whether the number of pages reaches a threshold value. If the number of pages does not reach the threshold value, a step S540 may be executed. In step S540, the page fault handler PFH may adjust the number of pages to two times the number of previously-allocated pages. Thereafter, the adjustment may be terminated.

If the number of pages reaches the threshold value, a step S550 may be executed. In step S550, the page fault handler PFH may adjust the number of pages to the number of previously-allocated pages. For example, the page fault handler PFH may adjust the number of pages to the same value as that in a previous fault handling operation. Thereafter, the adjustment may be terminated.

The inventive concept is not limited to the example in which the number of pages is adjusted to twice the number of previously-allocated pages by the page fault handler PFH. For example, the page fault handler PFH may increase the number of pages by a predetermined number. As an example, the page fault handler PFH may increase the number of pages by 2 or 4, when fault handlings associated with successive accesses are executed.

In some embodiments, the page fault handler PFH may execute the fault handlings associated with successive accesses in a divided manner including two or more phases. In the first phase, the page fault handler PFH may adjust the number of pages to have a value that is K times the number of previously-allocated pages, where K is a positive integer. In the second phase, the page fault handler PFH may adjust the number of pages to have a value that is obtained by adding a positive integer I to the number of previously-allocated pages.

In the aforementioned embodiments, the fault handling previously described with reference to FIGS. 5, 9, 10, and 11 (i.e., the fault handling according to the second embodiment) has been described to be executed on the first memory module 120. However, the fault handling described with reference to FIGS. 5, 9, 10, and 11 may be used for all of the first to fourth memory modules 120 to 150.

For example, when the fault handling previously described with reference to FIGS. 5, 9, 10, and 11 is executed on the second type memory modules 140 and 150, the logical addresses LA described with reference to FIGS. 5, 9, 10, and 11 may be changed to the physical addresses PA of the third or fourth memory module 140 or 150.

In some embodiments, the page fault handler PFH may execute the fault handling in a different manner, depending on the type of memory modules. For example, in the situation where a page fault occurs in the first type memory modules 120 and 130, the page fault handler PFH may execute the fault handling described with reference to FIGS. 5, 9, 10, and 11 (i.e., according to the second embodiment described hereinabove).

However, in the situation where a page fault occurs in the second type memory modules 140 and 150, the page fault handler PFH may execute the fault handling described with reference to FIGS. 5, 6, and 7 (i.e., according to the first embodiment described hereinabove). In some embodiments, information on types of the first to fourth memory modules 120 to 150 may be provided to the processor 110 from the SPD devices 125, 135, 145, and 155, at initialization.

Figure 13:
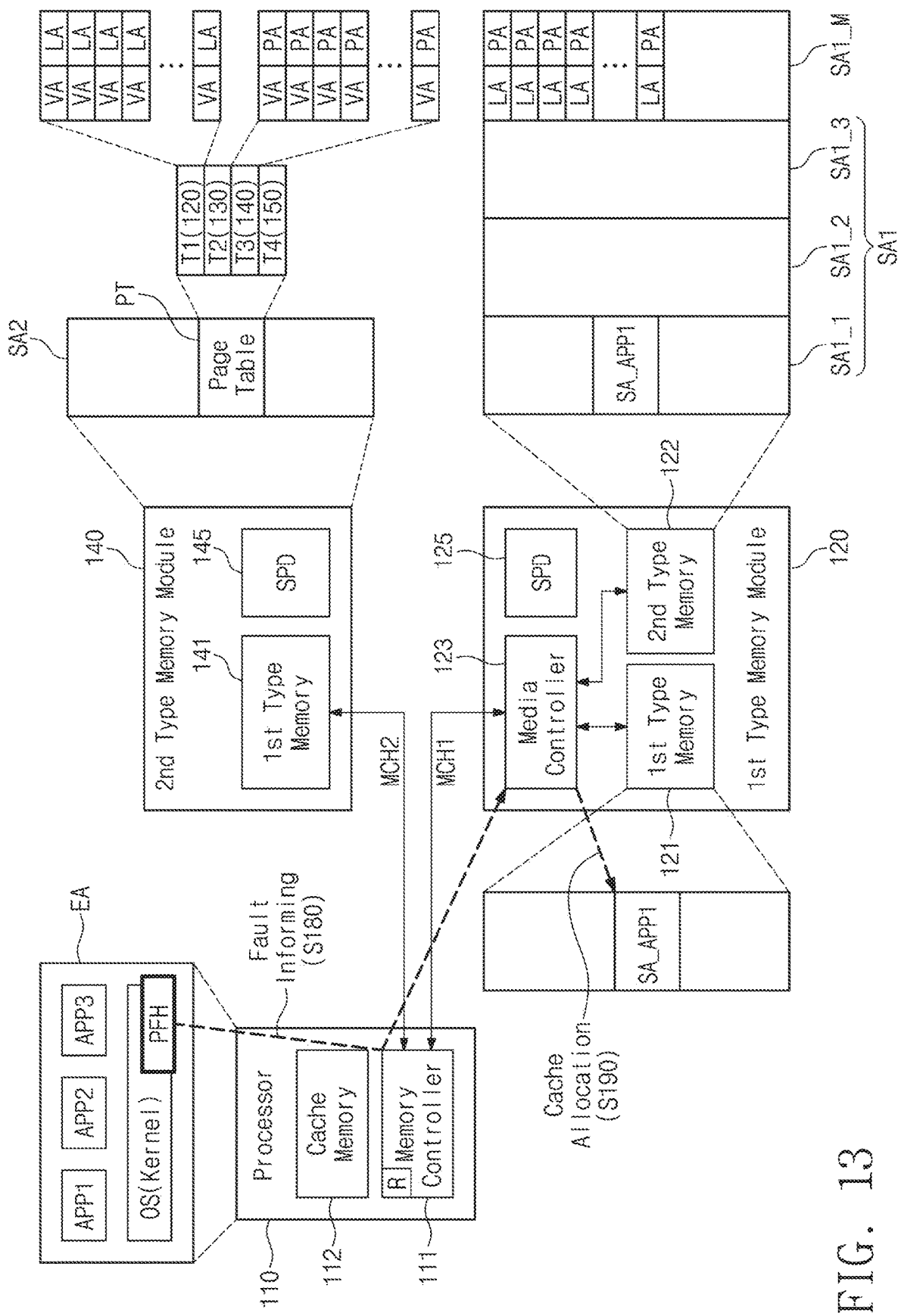
FIG. 13 illustrates an example in which results obtained by the fault handling are provided to a first memory module.

FIG. 13 illustrates an example in which results obtained by the fault handling are provided to the first memory module 120. Steps illustrated in FIG. 13 may be executed after the fault handling described with reference to FIGS. 3 and 4. Referring to FIGS. 1 and 13, the page fault handler PFH may execute fault informing operations, as shown by step S180.

For example, the page fault handler PFH may instruct the memory controller 111 to transmit the logical address LA, which is mapped during the fault handling, to the first memory module 120 associated with the corresponding logical address LA. The memory controller 111 may transmit the mapped logical address LA to the media controller 123 of the first memory module 120.

For example, the memory controller 111 may transmit a read command and a read address to the first memory module 120 to request a read operation. The memory controller 111 may transmit a write command and a write address to the first memory module 120 to request a write operation. The memory controller 111 may transmit the logical address LA, having a format different from the read command and the read address and from the write command and the write address, to the first memory module 120.

In some embodiments, the page fault handler PFH may execute the fault informing whenever the fault handling is executed. In certain embodiments, if the fault handling associated with successive addresses is repeated a specific number of times, the page fault handler PFH may execute the fault informing. In certain embodiments, if a new fault handling is not executed even when a specific time is elapsed after completion of a previous fault handling, the page fault handler PFH may execute the fault informing. Thus, the condition for the fault informing executed by the page fault handler PFH may be variously modified.

As described above, the fault handling may be executed when the first application APP1 requests allocation of a new memory. If the requested memory allocation is finished, the allocated memory may be exploited by the first application APP1. That is, if the fault handling is executed on a specific logical address LA, it may be expected that the specific logical address LA is planned to be accessed.

As shown by step S190 in FIG. 13, the media controller 123 may execute a cache allocation of mapping a storage space of the second type memory 122 corresponding to the specific logical address LA to the first type memory 121. For example, as the fault handling is executed on the logical addresses LA of the first application storage area SA_APP1 of the second type memory 122, the media controller 123 may map the first application storage area SA_APP1 to the first type memory 121.

In the case where the first application storage area SA_APP1 is mapped to the first type memory 121 by the media controller 123, a cache hit, not a cache miss, may occur in the first type memory 121, when the first application APP1 accesses the allocated memory. Thus, a speed of the memory system 100 may be increased.

Figure 14:
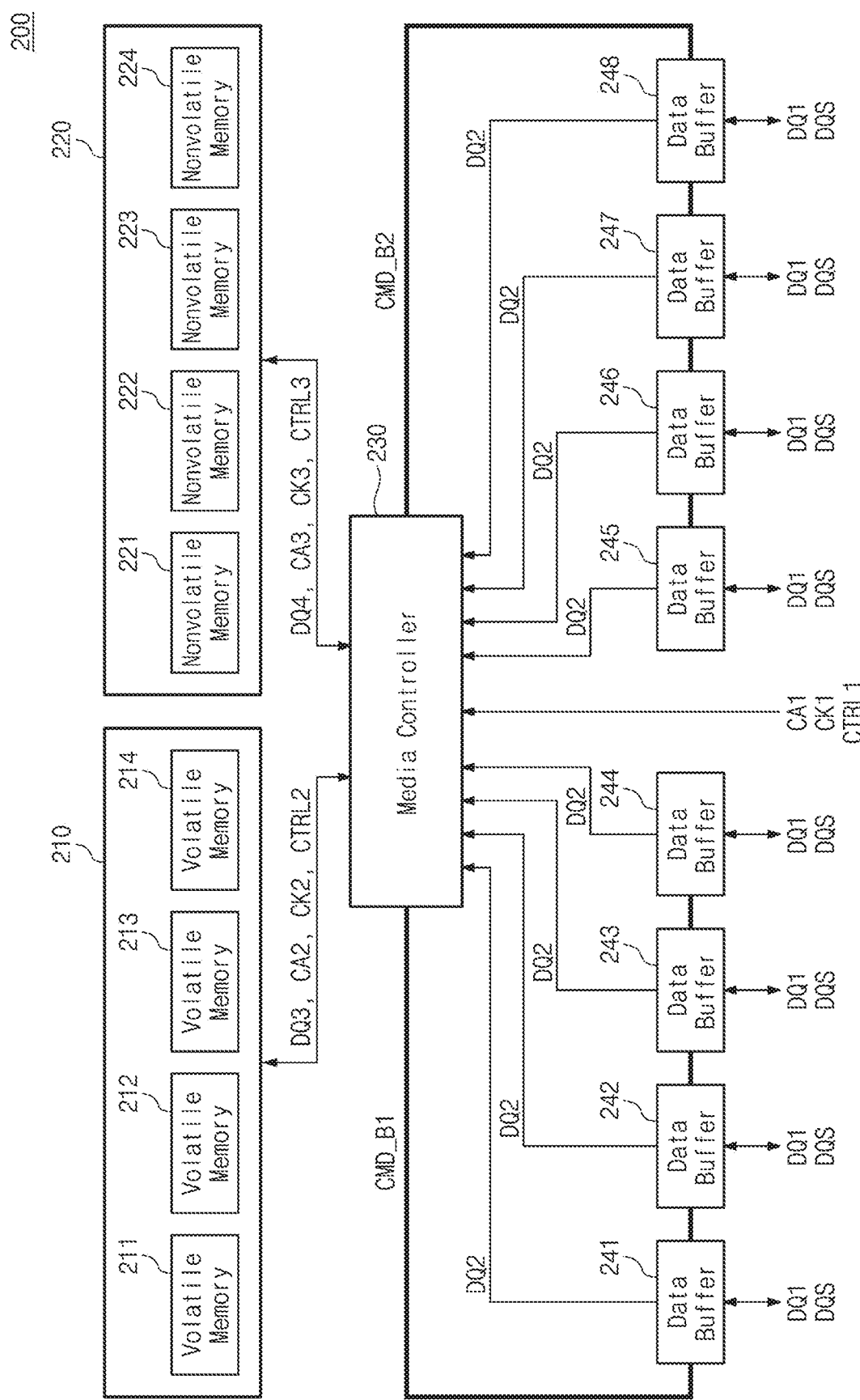
FIG. 14 is a block diagram illustrating a first type memory module according to some embodiments of the inventive concept.

FIG. 14 is a block diagram illustrating a first type memory module 200 according to some embodiments of the inventive concept. In some embodiments, the first type memory module 200 may be a memory module, which is provided to meet the requirements of the LRDIMM ("load reduced" DIMM) standard. Referring to FIGS. 1 and 14, the first type memory module 200 may include a volatile memory device 210, a non-volatile memory device 220, a media controller 230, and the first to eighth data buffers 241 to 248.

The volatile memory device 210 may include first to fourth volatile memories 211 to 214. The first to fourth volatile memories 211 to 214 may be realized using a plurality of packages which are separated from each other. The first to fourth volatile memories 211 to 214 may include dynamic random access memories. The volatile memory device 210 may be the first type memory 121 or 131.

The non-volatile memory device 220 may include first to fourth non-volatile memories 221 to 224. The first to fourth non-volatile memories 221 to 224 may be realized using a plurality of packages which are separated from each other. The first to fourth non-volatile memories 221 to 224 may be different storage areas, which are provided in the non-volatile memory device 220 and are identified with different addresses. The non-volatile memory device 220 may be the second type memory 122 or 132.

In particular, the non-volatile memory device 220 may include at least one of various non-volatile memory devices (e.g., including a FLASH memory device, a phase change memory device, a ferroelectric memory device, a resistive memory device, and a magnetic memory device).

The media controller 230 may receive a first command and address CA1, a first clock signal CK1, and a first control signal CTRL1 from the memory controller 111. The media controller 230 may exchange second data signals DQ2 with the first to eighth data buffers 241 to 248. The media controller 230 may access the volatile memory device 210 or the non-volatile memory device 220, depending on the first command and address CA1, the first clock signal CK1, and the first control signal CTRL1.

The media controller 230 may transmit a second command and address CA2, a second clock signal CK2, and a second control signal CTRL2 to the volatile memory device 210 and may exchange third data signals DQ3 with the volatile memory device 210. The media controller 230 may transmit a third command and address CA3, a third clock signal CK3, and a third control signal CTRL3 to the non-volatile memory device 220 and may exchange fourth data signals DQ4 with the non-volatile memory device 220.

In some of these embodiments, the first command and address CA1, the second command and address CA2, and the third command and address CA3 may have different formats. In certain embodiments, at least two of the first command and address CA1, the second command and address CA2, and the third command and address CA3 may have the same format. For example, a format for the media controller 230 to communicate with the volatile memory device 210 may be different from a format for the media controller 230 to communicate with the non-volatile memory device 220.

The media controller 230 may transmit a first buffer command CMD_B1 to control first to fourth data buffers 241 to 244. The media controller 230 may transmit a second buffer command CMD_B2 to control fifth to eighth data buffers 245 to 248.

The first to eighth data buffers 241 to 248 may exchange first data signals DQ1 with the memory controller 111 in synchronization with data strobe signals DQS. The first to eighth data buffers 241 to 248 may transmit the first data signals DQ1 received from the memory controller 111 to the media controller 230 as the second data signals DQ2.

The first to eighth data buffers 241 to 248 may transmit the second data signals DQ2, which are received from the media controller 230 to the memory controller 111 as the first data signals DQ1. The first to eighth data buffers 241 to 248 may be realized using a plurality of packages which are separated from each other.

In some embodiments, the volatile memory device 210 may be used as a cache memory of the non-volatile memory device 220. A portion of the storage space of the non-volatile memory device 220 may be mapped to the volatile memory device 210.

When a first storage space, which is indicated by the first command and address CA1 received from the memory controller 111, is mapped to the volatile memory device 210 (i.e., when a cache hit occurs), the media controller 230 may transmit the second command and address CA2 to the volatile memory device 210. The volatile memory device 210 may execute a write or read operation, depending on the second command and address CA2.

In the case where the first storage space, which is indicated by the first command and address CA1 received from the memory controller 111, is not mapped to the volatile memory device 210 (i.e., when a cache miss occurs), the media controller 230 may map the first storage space, which is indicated by the first command and address CA1, to the volatile memory device 210.

For example, it may be possible to secure a second storage space, which is associated with the first storage space of the non-volatile memory device 220, in the volatile memory device 210. If a storage space of the volatile memory device 210 is insufficient, the media controller 230 may discard other storage space, which is mapped to the volatile memory device 210, or may return other storage space to the non-volatile memory device 220, and in this case, it may be possible to secure a storage space in the volatile memory device 210.

If there are data stored in the first storage space of the non-volatile memory device 220, the media controller 230 may copy the data in the first storage space to the second storage space of the volatile memory device 210. Thereafter, the media controller 230 may transmit the second command and address CA2 to the volatile memory device 210. The volatile memory device 210 may execute a write or read operation on the second storage space in response to the second command and address CA2.

In some embodiments, if the fault informing is transmitted through the first command and address CA1, the media controller 230 may map a storage space of the non-volatile memory device 220, which corresponds to a logical address or logical addresses included in the fault informing, to the volatile memory device 210. The fault informing may be transmitted in a format different from the first command and address CA1 for the read operation or the first command and address CA1 for the write operation. For example, the media controller 230 may receive the first command and address CA1 for the fault informing and may execute a cache allocation.

When the second storage space is released from the volatile memory device 210, the media controller 230 may check whether the second storage space is dirty. For example, in the case where a write operation has been executed on the second storage space, the second storage space may be determined to be dirty.

If the second storage space is not "dirty," the media controller 230 may discard the data of the second storage space to release the second storage space. If the second storage space is "dirty," the media controller 230 may write the data of the second storage space in the non-volatile memory device 220 to return the second storage space. After the returning of the second storage space, the media controller 230 may discard and release the second storage space.

In certain embodiments, the volatile memory device 210 and the non-volatile memory device 220 may be directly accessed by the memory controller 111. For example, in the case where the first command and address CA1 or the first control signal CTRL1 indicates the volatile memory device 210, the media controller 230 may transmit the second command and address CA2, the second clock signal CK2, or the second control signal CTRL2 to the volatile memory device 210.

In the case where the first command and address CA1 or the first control signal CTRL1 indicates the non-volatile memory device 220, the media controller 230 may transmit the third command and address CA3, the third clock signal CK3, or the third control signal CTRL3 to the non-volatile memory device 220.

In some embodiments, the number of volatile memories, the number of non-volatile memories, and the number of data buffers are not fixed. For example, the number of the volatile or non-volatile memories may be equal to the number of the data buffers, and the number of the data buffers may be changed to nine.

The media controller 230 may store the mapping information between the logical addresses LA and the physical addresses PA in the first meta-storage area SA1_M (e.g., see FIG. 2) of the non-volatile memory device 220. The first command and address CA1 received from the memory controller 111 may be based on the logical addresses LA of the non-volatile memory device 220.

When the media controller 230 accesses the non-volatile memory device 220 according to the first command and address CA1, the media controller 230 may convert the logical addresses LA into the physical addresses PA according to the mapping information. The media controller 230 may use the converted physical addresses PA to access the non-volatile memory device 220. That is, the third command and address CA3 may be based on the physical addresses PA.

The cache allocation of the non-volatile memory device 220 to the volatile memory device 210 may be executed based on the logical or physical addresses LA or PA. That is, the second command and address CA2 may be based on the logical or physical addresses LA or PA. In the media controller 230, the logical or physical addresses LA or PA may be used to determine whether a cache hit or a cache miss occurs.

According to some embodiments of the inventive concept, when a page fault occurs, a memory system may allocate two or more pages during a single fault handling. Thus, it may be possible to more quickly execute fault handlings and to realize a memory system with an improved speed. In addition, according to some embodiments of the inventive concept, when the fault handling is executed, a semiconductor memory module may execute a cache allocation of addresses, which are allocated by the fault handling. Thus, it may be possible to more quickly execute an access following the fault handling and to realize a semiconductor memory module having improved speed.

While example embodiments of the inventive concept have been particularly shown and described, it will be understood by one of ordinary skill in the art that variations in form and detail may be made therein without departing from the spirit and scope of the attached claims.

What is claimed is:

1. A memory system, comprising:
a first semiconductor memory module; and
a processor configured to: (i) access the first semiconductor memory module by units of a page; and (ii) respond to an occurrence of a page fault in a specific page, which is associated with a virtual address corresponding to an access target, by adjusting a number of pages and allocating pages in the first semiconductor memory module corresponding to the adjusted number of the pages, which are associated with the virtual address, said adjusting comprising adjusting the number of pages to a number of previously allocated pages associated with a prior access to the first semiconductor memory module when a virtual address of the prior access and the virtual address of the access are successive and the number of the allocated pages reaches a threshold value.

2. The memory system of claim 1, wherein said processor is configured to allocate one of the allocated pages to the virtual address and another of the allocated pages to a next virtual address following the virtual address, when the number of the pages is adjusted to a value of 2 or greater.

3. The memory system of claim 1, wherein said processor is configured to adjust the number of the pages to a default value, when the virtual address of the access and a previous virtual address of a previous access are not successive.

4. The memory system of claim 1, wherein said processor is configured to adjust the number of the pages to at least two times a number of previously-allocated pages of the previous access, when the virtual address of the access and a previous virtual address of a previous access are successive, but the number of the allocated pages has not reached a threshold value.

5. The memory system of claim 1, wherein said processor is configured to inform the first semiconductor memory module about logical addresses of the allocated pages.

6. The memory system of claim 5, wherein the first semiconductor memory module comprises:
a non-volatile memory;
a random access memory; and
a media controller configured to provide a storage space of the non-volatile memory to said processor and to use the random access memory as a cache memory of the non-volatile memory.

7. The memory system of claim 6, wherein the media controller is configured to execute a cache allocation on the random access memory according to the logical addresses.

8. The memory system of claim 1, further comprising a second semiconductor memory module, which is configured to store mapping information between logical addresses and virtual addresses of the first semiconductor memory module; and wherein the page fault occurs when the mapping information of the virtual address is not stored in the second semiconductor memory module.

9. A memory system, comprising:
a first semiconductor memory module; and
a processor configured to access the first semiconductor memory module by units of a page and further configured to execute fault handlings N times when an application driven by said processor is allocated to M pages, where M is a positive integer and N is a positive integer less than M; and
wherein, when a number of the logical addresses and a number of the virtual addresses, which are mapped to each other by each of the fault handlings to be executed N times, reach a threshold value, the number of the logical addresses and the number of the virtual addresses are maintained.

10. The memory system of claim 9, wherein the fault handlings to be executed N times include operations to map logical addresses of the M pages to respective virtual addresses of the application.

11. The memory system of claim 10, wherein a specific fault handling of the fault handlings to be executed N times includes operations to map at least two logical addresses among the logical addresses to respective ones of at least two virtual addresses among the virtual addresses.

12. The memory system of claim 10, further comprising a second semiconductor memory module; and wherein said processor is configured to store mapping information between the logical and virtual addresses in the second semiconductor memory module.

13. The memory system of claim 9, wherein the number of logical addresses and the number of virtual addresses, which are mapped to each other by each of the fault handlings to be executed N times, are sequentially increased.

14. A memory system, comprising:
   a first semiconductor memory module; and
   a processor configured to access the first semiconductor memory module by units of a page and further configured to execute fault handlings N times when an application driven by said processor is allocated to M pages, where M is a positive integer and N is a positive integer less than M;
   wherein said processor is configured to transmit a write command, a write address, a read command, and a read address to the first semiconductor memory module; and
   wherein said processor is further configured to inform the first semiconductor memory module about the logical addresses having a format different from a format of the write command and the write address, and a format of the read command and the read address.

15. The memory system of claim 14, wherein said processor is configured to inform the first semiconductor memory module about logical addresses of the M pages.

* * * * *